(12) United States Patent
Lasser et al.

(10) Patent No.: US 9,350,869 B1
(45) Date of Patent: May 24, 2016

(54) SYSTEM AND METHODS FOR SELECTIVE AUDIO CONTROL IN CONFERENCE CALLS

(71) Applicant: COMIGO LTD., Yarkona (IL)

(72) Inventors: Menahem Lasser, Kohav Yair (IL); Ronen Segal, Herzliya (IL)

(73) Assignee: Comigo Ltd., Yarkona (IL)

(*) Notice: Subject to any disclaimer, the term of this patent is extended or adjusted under 35 U.S.C. 154(b) by 0 days.

(21) Appl. No.: 14/816,230

(22) Filed: Aug. 3, 2015

Related U.S. Application Data

(60) Provisional application No. 62/106,277, filed on Jan. 22, 2015.

(51) Int. Cl.
*H04M 3/42* (2006.01)
*H04M 3/56* (2006.01)

(52) U.S. Cl.
CPC ..................................... *H04M 3/568* (2013.01)

(58) Field of Classification Search
CPC .... H04M 3/56; H04M 3/42153; H04M 3/568

USPC ............ 379/202.01, 204.01, 203.01, 201.01; 455/416

See application file for complete search history.

(56) References Cited

U.S. PATENT DOCUMENTS

| 6,674,842 | B2 | | 1/2004 | Weinman | |
|---|---|---|---|---|---|
| 8,804,577 | B1 | * | 8/2014 | Kondapalli | ......... H04L 12/1822 348/14.08 |
| 9,019,868 | B2 | * | 4/2015 | Gorti | ...................... H04M 3/56 370/260 |

* cited by examiner

*Primary Examiner* — Thjuan K Addy
(74) *Attorney, Agent, or Firm* — Yagod Morris & Associates Ltd.

(57) ABSTRACT

A conference call system and method thereof for controlling audio channels in a conference call. In particular, the conference call system enables a common communication session in which multiple participants may control audio settings associated with other participants. Selective audio control of the associated channel may be used for muting or unmuting a specific communication device, adjusting the volume level of an audio signal received from a specific communication device, altering various additional parameters of an audio signal received from a specific communication device, and the like.

25 Claims, 11 Drawing Sheets

SYSTEM AND METHODS FOR SELECTIVE AUDIO CONTROL IN CONFERENCE CALLS

CROSS-REFERENCE TO RELATED APPLICATIONS

This application claims the benefit of U.S. Provisional Patent Application 62/106,277, filed Jan. 22, 2015, the disclosure of which is hereby incorporated in its entirety by reference herein.

FIELD OF THE INVENTION

The disclosure herein relates to controlling audio signals during a conference call. In particular, the disclosure relates to controlling volume levels or other audio settings of audio signals between multiple communication devices associated with the participants in a common multi-participant communication session.

BACKGROUND OF THE INVENTION

Conferencing and collaborating is of great importance in the dynamic environments of the modern world. Technology, in particular with the rapid changes, has significant impact on the way we communicate, and the values we attach to it.

Conference calls, connecting multiple participants in different locations into a common communication session have become very common. Conference call sessions may share audio or may combine video and audio in a communication session. As used herein, the term "conference call" may refer to an "audio communication session" or to a "video communication session" between two or more participants.

Conference call sessions may have poor sound quality, with participants experiencing echoes, feedback, background noise or other such interruptions. Sound quality may differ for different participants due to different phone companies, international callers, or quality of voice-over-IP (VoIP) lines. Furthermore, the participants in a call generally use different types of communicating devices, and speak at different distances from their microphones and at different volumes. Moreover, the participants may be in different environments, experiencing different levels of background noise.

Feedback issues may arise due to impedance mismatch in receivers, and echo issues may occur where communication terminals lack isolation between speaker and microphone. Thus, commonly one participant of a conference call may face difficulties in hearing and/or understanding another participant while the sound from other participants in the same session may be received without a problem.

It is noted that high quality conferencing-dedicated telephones or land line telephones may provide better call quality, while cellular phones may provide lower call quality. Thus, in one possible scenario, upon receiving low-quality sound from one participant, the receiving participant may operate the volume control of his/her communication device (telephone, TV screen, laptop, tablet and the like), to increase the volume level. This may provide better sound quality received from one participant, but at the same time, the volume increase may negatively affect the audio signals received from the other participant, if for example, the volume is too high or reaches an inconvenient volume level. Commonly, this may occur as the typical receiving device is not selective and the increase of volume level applies to all sources of audio played by the communication device.

It is further noted that a communication device associated with a participant may not be properly adjusted prior to entering a conference call session. For example, the setting of the device microphone may be incorrectly adjusted or the speakerphone volume may be turned up too high.

Another possible scenario may occur when a participant is located in a noisy environment with background noise such as barking dogs, crying babies, clattering dishes or the like. Typically, the disturbing participant may be asked to mute his device or may be forced to do so if the system supports such functionality. Yet, it is highly desirable to have a functionality of selectively reducing the volume level of an interrupting communication device, or selectively muting a specific participant.

U.S. Pat. No. 6,674,842 describes a multi-line telephone device that may be used for conference calls and provides the user with the ability to selectively control (or mute) the volume level of each of the other participants in a conference call session. This is achieved by providing the user of such a phone with a complex user interface containing many controls and options which one needs to manipulate in order to achieve the desired result. Additionally, the solution of U.S. Pat. No. 6,674,842 requires extra circuitry for separately processing audio transmission of different participants (either in the phone itself or in the phone network).

SUMMARY OF SELECTED EMBODIMENTS

When one participant of a common communication session is poorly heard by other participants or may be disrupting a conference call, it is generally necessary for each of the other participants in the communication session to adjust their volume levels or, where such functionality is available, to selectively adjust a volume setting for that one disruptive participant or to selectively mute the audio signal of that one disruptive participant.

The need remains for a method for multiple participants of a communication session to simultaneously adjust the audio settings for a particular participant during a multi-participant communication session.

Accordingly, a method is disclosed herein for use in a conference call system comprising a set of communication devices, the conference call system enabling a common communication session between at least a first participant associated with a first communication device, a second participant associated with a second communication device and a third participant associated with a third communication device, the method for controlling in an improved manner at least a second device audio signal sent by the first communication device to the second communication device using an initial set of audio settings and a third device audio signal sent by the first communication device to the third communication device using the initial set of audio settings. The disclosed method may comprise the following steps: receiving a request from the second communication device for an adjustment to at least one audio setting of the second device audio signal; determining an adjusted set of audio settings according to the request; and providing the second device audio signal to the second communication device using the adjusted set of audio settings and providing the third device audio signal to the third communication device using the adjusted set of audio settings.

Where the second device audio signal and the third device audio signal share a common root signal output from the first communication device, the method may further comprise applying the adjusted set of audio settings to the root signal.

In some embodiments, the second device audio signal is transmitted by the first communication device as a distinct audio signal directed to the second communication device and the third device audio signal is transmitted by the first communication device as a distinct audio signal separately directed to the third audio communication device.

Where appropriate the second device audio signal is received by the second communication device directly from the first communication device, and the determining of the adjusted set is performed by the first communication device.

Optionally, the conference call system further comprises a central processor. Accordingly, the second device audio signal may be received by the second communication device from the first communication device via the central processor and the determining of the adjusted set may be performed by the central processor.

Where the conference call system further comprises a processor, the steps of receiving, determining and providing may be executed by the processor. Optionally, the processor may be incorporated into at least one of the first communication device, the second communication device, and the third communication device. Alternatively, the processor may be incorporated into a central processing unit.

In some embodiments, an audio volume level of the adjusted set of audio settings differs from an audio volume level of the initial set of audio settings. In other embodiments, the audio volume level of the adjusted set of audio settings is a muted audio level.

According to some embodiments, the method may further include adjusting an audio volume level associated with the initial set of audio settings. By way of example, the method may include adjusting the initial set of audio settings by muting and unmuting an audio signal.

Variously, the request requests an adjustment of an audio volume level of the second device audio signal, and the adjustment is defined as one of an absolute value of an audio volume level, an absolute offset to a current value of an audio volume level, and a relative offset to a current value of an audio volume level. Accordingly, the method may include adjusting the audio volume level by at least one action selected from a group consisting of: setting an adjusted volume level to an absolute value setting, adjusting an initial volume level by an absolute offset value and adjusting an initial volume level by a relative offset value from the current audio setting volume.

Optionally, the initiator of the common communication session may be the second participant. Alternatively, the initiator of the common communication session may be a participant other than the second participant.

Another method is disclosed for use in a conference call system comprising a set of communication devices, the conference call system enabling a common communication session between at least a first participant, associated with a first communication device, a second participant associated with a second communication device and a third participant associated with a third communication device, the method for controlling in an improved manner at least a second device audio signal sent by the first communication device to the second communication device, using an initial set of audio settings. The second method comprises the following steps: receiving a request from the second communication device for an adjustment to at least one audio setting of the second device audio signal; obtaining at least one third device audio characteristic associated with the third communication device; determining an adjusted set of audio settings according to the request from the second communication device and according to the at least one third device audio characteristic; and providing the second device audio signal to the second communication device using the adjusted set of audio settings.

Optionally, the request from the second communication device requests an adjustment to an audio volume level of the second device audio signal.

Where appropriate, the at least one third device audio characteristic comprises an indication of quality of a third device audio signal sent by the first communication device to the third communication device. Optionally, the at least one third device audio characteristic comprises an indication of an audio volume level of the third device audio signal or of the third communication device.

Where appropriate, obtaining the at least one third device audio characteristic is performed periodically. Additionally or alternatively, obtaining the at least one third device audio characteristic may be performed in response to receiving the request from the second communication device.

Still another method is disclosed for use in a communication system enabling a common communication session between at least a first participant, associated with a first communication device, and a second participant associated with a second communication device, the method for controlling in an improved manner at least a second device audio signal sent by the first communication device to the second communication device, using an initial set of audio settings. The third method comprising the following steps: receiving, by the first communication device, a request from the second communication device for an adjustment to at least one audio setting of the second device audio signal; determining, by the first communication device, an adjusted set of audio settings according to the request from the second communication device; and applying, by the first communication device, the adjusted set of audio settings to the second device audio signal. Optionally, the request is transmitted from the second communication device to the first communication device through a network used for sending the second device audio signal from the first communication device to the second communication device.

According to another aspect of the invention, a communication system is disclosed for enabling audio control during a common communication session between at least a first participant and a second participant. The communication system may comprise: a first communication device associated with the first participant and operable to send at least a second device audio signal; a second communication device associated with the second participant and operable to receive at least the second device audio signal and to send a request for an adjustment to at least one audio setting of the second device audio signal; and at least one processor operable to receive the request from the second communication device, to determine an adjusted set of audio settings according to the request; and to provide the second device audio signal to the second communication device using the adjusted set of audio settings. Optionally, the at least one processor is incorporated into the first communication device. Alternatively, the at least one processor may be incorporated into a central processing unit.

In various embodiments, the communication system may be provided for enabling audio control during the common communication session between the first participant, the second participant and a third participant, the communication system further comprising: a third communication device associated with the third participant and operable to receive at least a third device audio signal from the first communication device. Accordingly, the at least one processor may be further operable to provide, in response to the request, the third device audio signal to the third communication device using the adjusted set of audio settings.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings.

DETAILED DESCRIPTION OF THE INVENTION

Aspects of the present disclosure relate to systems and methods for controlling audio settings of communication sessions such as conference calls and the like. In particular selective control may be used for adjusting the volume level of one participant for all the other participants. Additionally or alternatively, selective control may be used for muting or unmuting a communication device associated with one participant for all the other participants. Participants of the conference call may use various communication devices such as mobile communication devices, computers, laptops, tablets, hand-held devices or other suitable devices enabling a person to join a conference call session.

In a conference call session, one participant, for example the host or the initiator of the conference call, may be able to adjust the volume of another participant such that the conference call flow is undisturbed. With such practice, only one participant may need make an adjustment for the benefit of other conference call participants.

Alternatively, where appropriate to achieve the above no special processing circuitry may be used at all.

As used herein "a conference call" refers to a common communication session and is to be considered as a meeting conducted over a telephone or over a communication network such as the Internet, using audio, in which at least two parties participate, usually for the purpose of discussing a particular subject. Other terms which may be used interchangeably include "a common communication session", "a teleconference", "a telephone conferencing", "a telephone meeting", "a telephone call", "a voice conference", "an audio conference", or "a conferencing call". A conference call may use a landline telephone but one can also use a mobile phone, a computer with an internet connection, Voice-over-IP systems and the like.

Figure 1A:
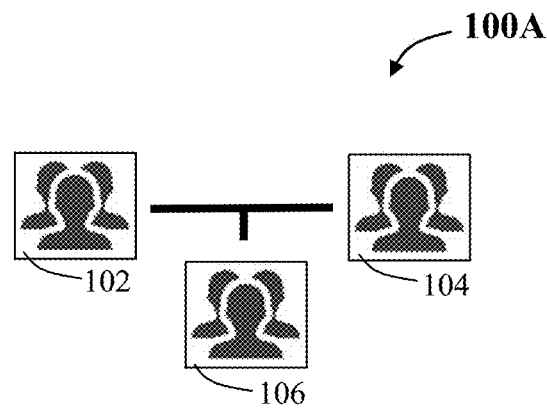
FIGS. 1A-C schematically illustrate possible configurations of a communication system such as a conference call system layout for managing common communication sessions according to examples of the presently disclosed subject matter.
Figure 1B:
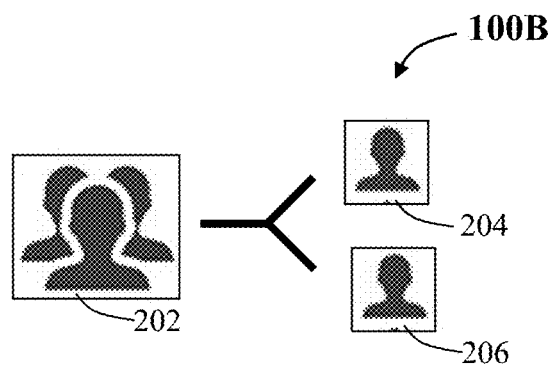
Figure 1C:
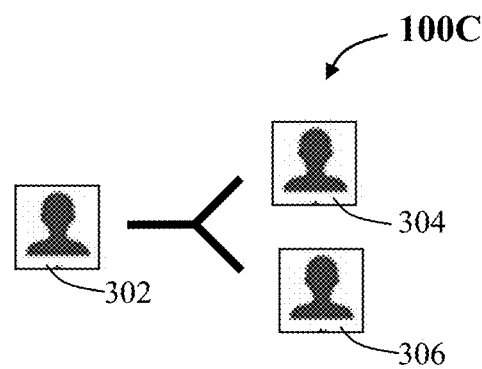

Reference is now made to the schematic diagrams of FIGS. 1A-C, illustrating possible conference call system layout configurations 100A-C. The common communication session may enable communication between a set of participants 102, 104, 106. It is noted that each participant may be an individual 204, 206 or a group of audience/participants 202 grouped in a conference room, for example. Each participant in such a common communication session may be equipped with the appropriate communication devices to allow the common communication session.

Accordingly, a common communication session 100A may be held between groups of individuals 102, 104, 106, each group being associated with a joint communication device. Alternatively, a common communication session 100B may be held between one group 202 of individuals having a joint communication device and other individual participants 204, 206, each individual participant being associated with a dedicated communication device. Alternatively again, a common communication session 100C may be held between individuals 302, 304, 306, each associated with a dedicated communication device.

It is noted that different individual participants or audience/participants groups may be in different geographical locations. As appropriate, a participant may use various communication devices to join a common communication session. Accordingly, a communication device may be a land line telephone, a central tele-conferencing device (operable in a conference room, for example), a smartphone, a mobile communicating device, a handheld device, a tablet, a laptop computer, a personal computer, a headphone, a whiteboard, a smart-board and the like.

It is further noted that a communication device may need to have an internet connection, connectable via a wireless network or connectable via a Public Switched Telephone Network (PSTN) directly or possibly via a PSTN gateway, for example. Variously, communication preferences may be configurable via a preference definition profile.

In various embodiments of the disclosure, one or more tasks as described herein may be performed by a data processor, such as a computing platform or distributed computing system, for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or for testing embodiments of the disclosure. Nevertheless, particular methods and materials are described herein for illustrative purposes only. The materials, methods, and examples are not intended to be necessarily limiting.

The platform, methods, systems and architecture described hereinafter, are made purely by way of example to better illustrate various aspects of the current disclosure.

Configuration Layouts:

It is noted that the conference call system layouts (FIGS. 2A-D) described hereinafter represent, by way of example, various possible practical configurations according to the presently disclosed subject matter. It should be appreciated that other alternative layouts, similar or equivalent to those described herein may be used in the practice.

Figure 2A:
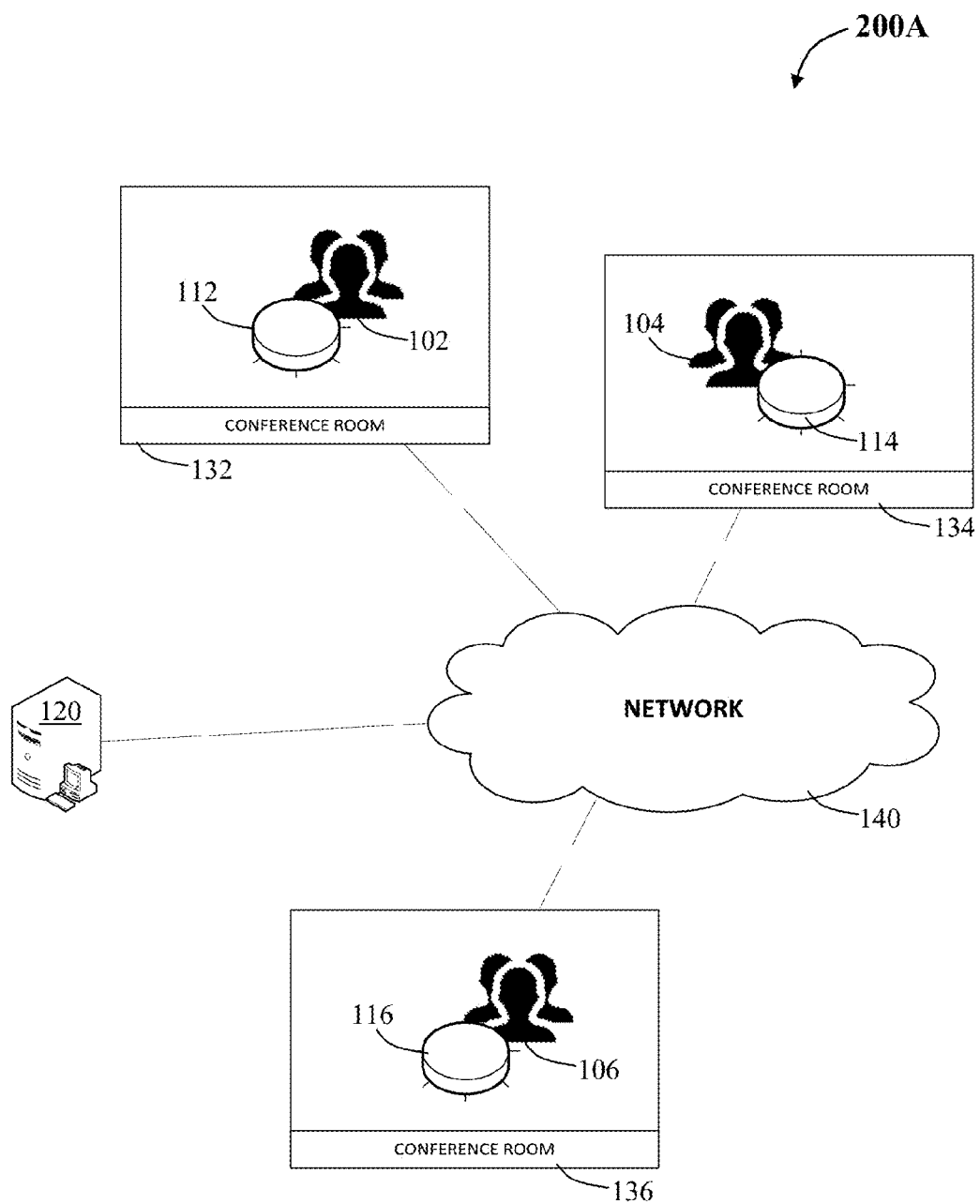
FIG. 2A-D schematically illustrate possible configurations of a communication network system layout according to other examples of the presently disclosed subject matter.
Figure 2B:
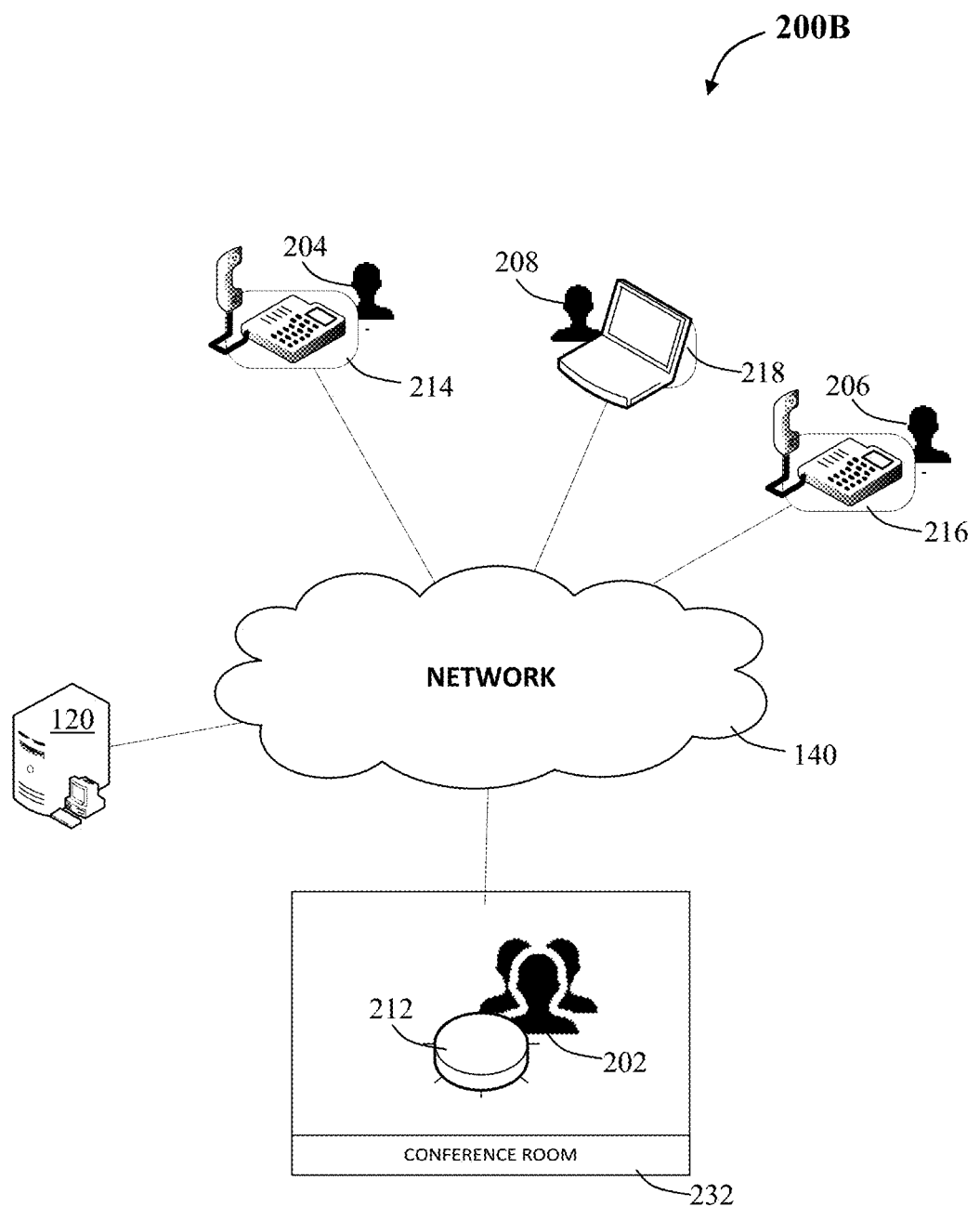
Figure 2C:
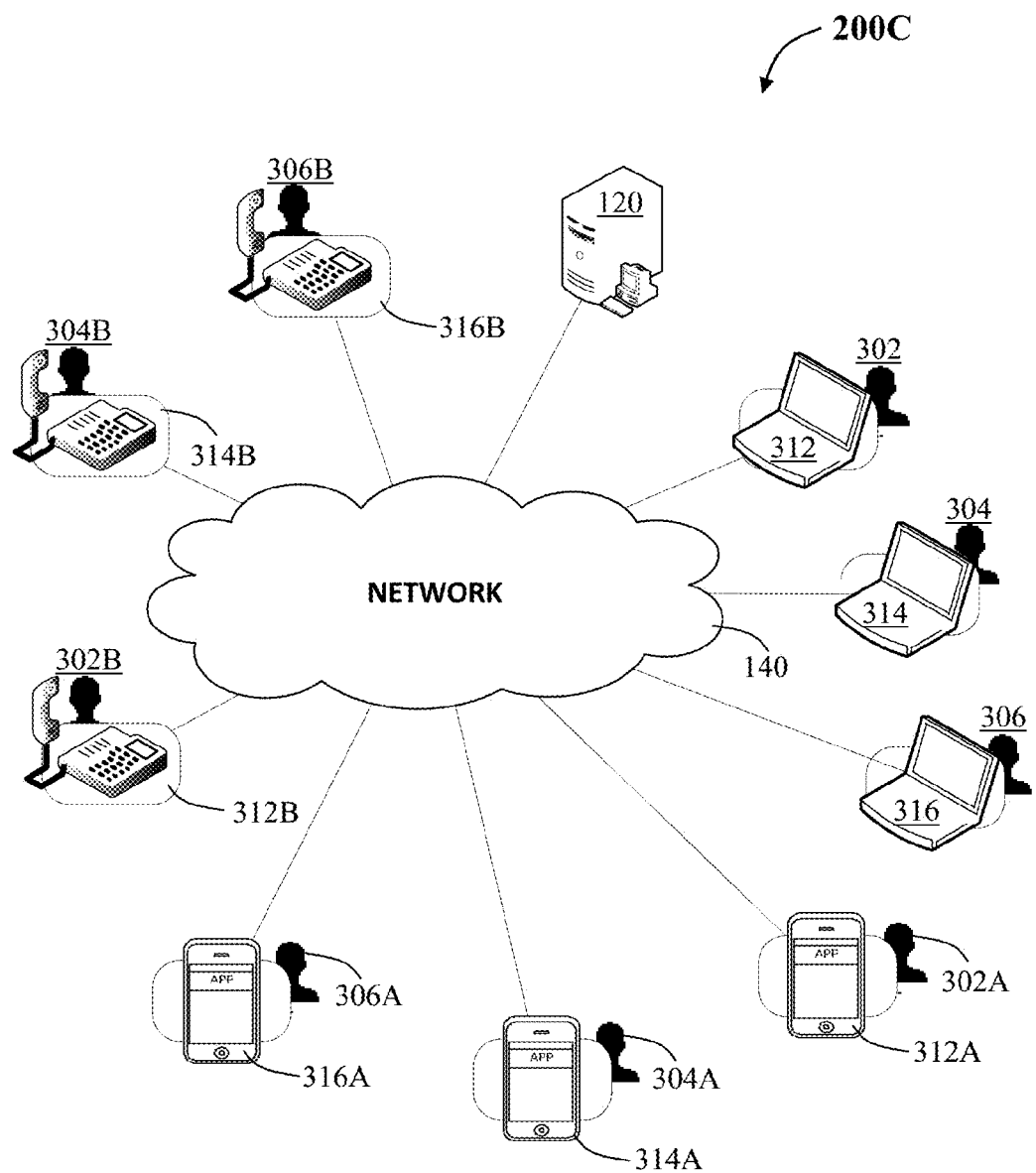
Figure 2D:
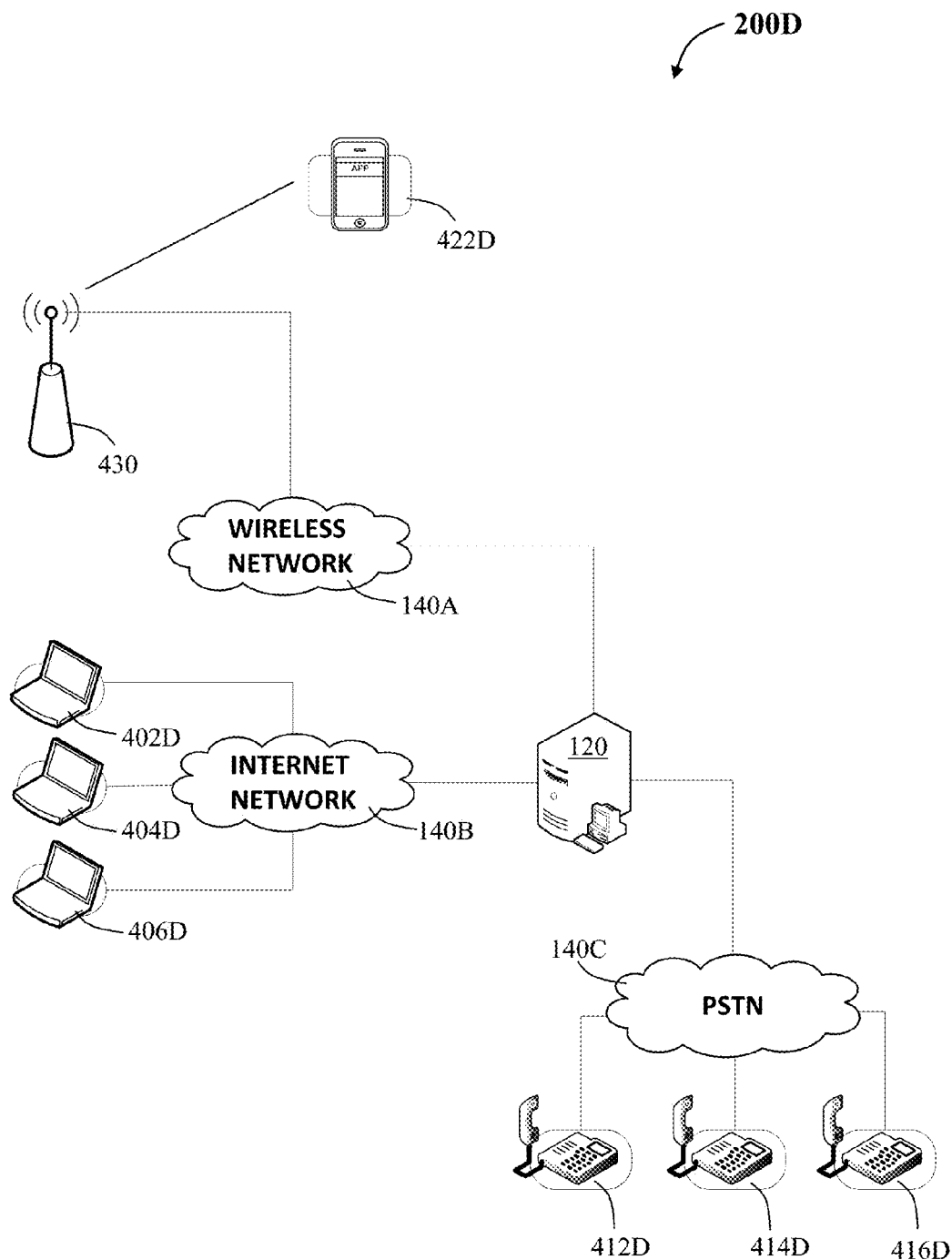
Figure 3A:
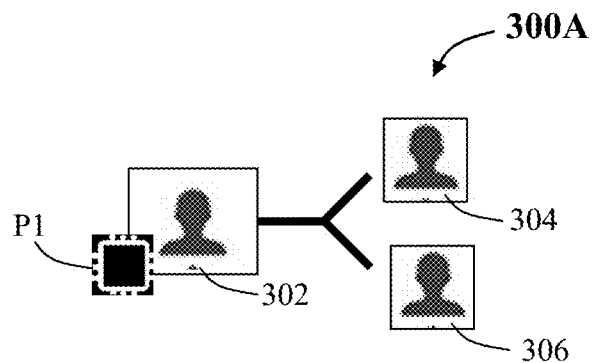
FIG. 3A-D schematically illustrate still further configurations of a communication system including a processing unit.
Figure 3B:
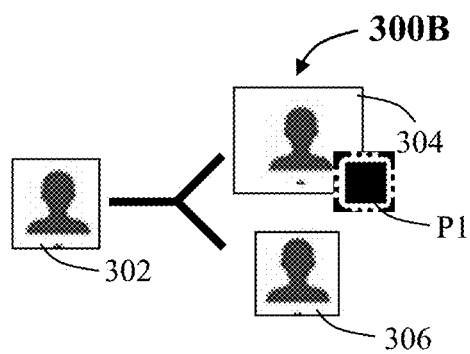
Figure 3C:
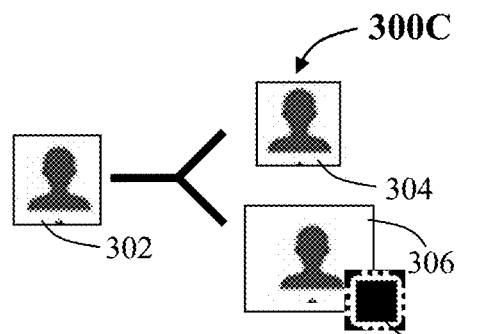
Figure 3D:
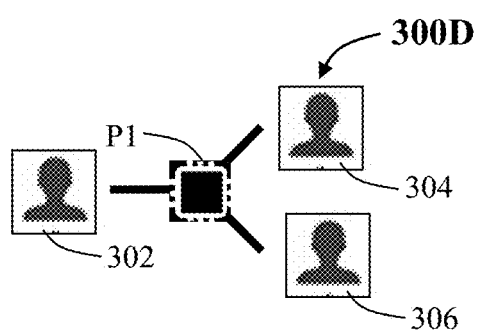

It is further noted that each such configuration (FIGS. 2A-D) may be associated with a schematic layout (FIG. 1A may be associated with FIG. 2A, FIG. 1B may be associated with FIG. 2B and FIG. 1C may be associated with FIGS. 2C and 2D).

Reference is now made to FIG. 2A, there is provided a schematic illustration of a possible conference call system layout 200A according to the presently disclosed subject matter. The conference call system layout 200A comprises three conference rooms 132, 134, 136 in different geographical locations, optionally in communication with a provider server 120 via a communication network 140. A group of audience/participants 102 may use conference room 132 which is associated with a communication device 112 and may join a conference call with another group of audience/participants 104 using conference room 134 which is associated with a communication device 114 and another group of audience/participants 106 using conference room 136 which is associated with a communication device 116.

Reference is now made to FIG. 2B, there is provided another schematic illustration of a possible conference call system layout 200B according to the presently disclosed subject matter. The conference call system layout 200B comprising a conference room 232 as a participant associated with a group of audience/participants 202 using a communication device 212, such as a central teleconference system for example, and two other individual participants 204, 206 associated with a land line telephone communication devices 214, 216 and still another individual participant 208 associated with a laptop computer communication device 218 operable to join the conference call. The communication device 212, 214, 216, 218 of each participant is in communication with a provider server 120 via a communication network 140.

Reference is now made to FIG. 2C, there is provided a schematic illustration of yet another possible conference call system layout 200C according to the presently disclosed subject matter. The conference call system layout 200C comprising a plurality of individual participants each associated with a communicating device operable to join a conference call. Various participants 302B, 304B and 306B, for example, may use land-line telephones 312B, 314B and 316B. Further, the individual participants 302, 304, 306, may use laptop computers 312, 314, 316, and the individual participants 302A, 304A, 306A may use mobile devices 312A, 314A, 316A. Accordingly, all participants' communication devices are in communication with a provider server 120 via a communication network 140.

With reference to FIGS. 2A, 2B and 2C, as appropriate, the provider server may be operable to send event-related signals/messages to the various communication devices. These signals/messages may allow viewing of calling participants, joining or leaving a conference call, controlling of audio settings for each participant, increase and decrease volume level for participants, mute and un-mute control signals and support of various control functionalities. As appropriate, the main interactions with the users may be generated by software packages installed on any of the communication devices.

Reference is now made to FIG. 2D, there is provided a block diagram illustration of network coupling of a conference call system layout 200D according to the presently disclosed subject matter. The network coupling system layout 200D comprising a plurality of individual participants associated with communicating devices operable to join a conference call thorough various types of communication networks, including a wireless network 140A, an internet network 140B and a Public Switched Telephone Network (PSTN) network 140C.

The wireless network 140A, such as a cellular network, may provide network connectivity to mobile communication devices, such as smartphone 422D through a wireless antenna 430; the internet network 140B provides network connectivity to laptop computers 402D, 404D and 406D, as an example; and the PSTN network 140C provides network connectivity to land-line telephones 412D, 414D and 416D.

Referring now to FIGS. 3A-D, schematic illustrations of various configurations 300A, 300B, 300C, 300D of a communication system including a processing unit P1 are shown. Three participants 302, 304, 306, are enabled to hold a common communication session such as a conference call over the communication system enabled by a processing unit P1. According to a first configuration 300A the processing unit P1 may be incorporated into a communication device associated with the first participant 302. According to a second configuration 300B the processing unit P1 may be incorporated into a communication device associated with the second participant 304. According to a third configuration 300C the processing unit P1 may be incorporated into a communication device associated with the third participant 306. According to a fourth configuration 300D the processing unit P1 may be incorporated into a central node of the communication system.

Figure 4:
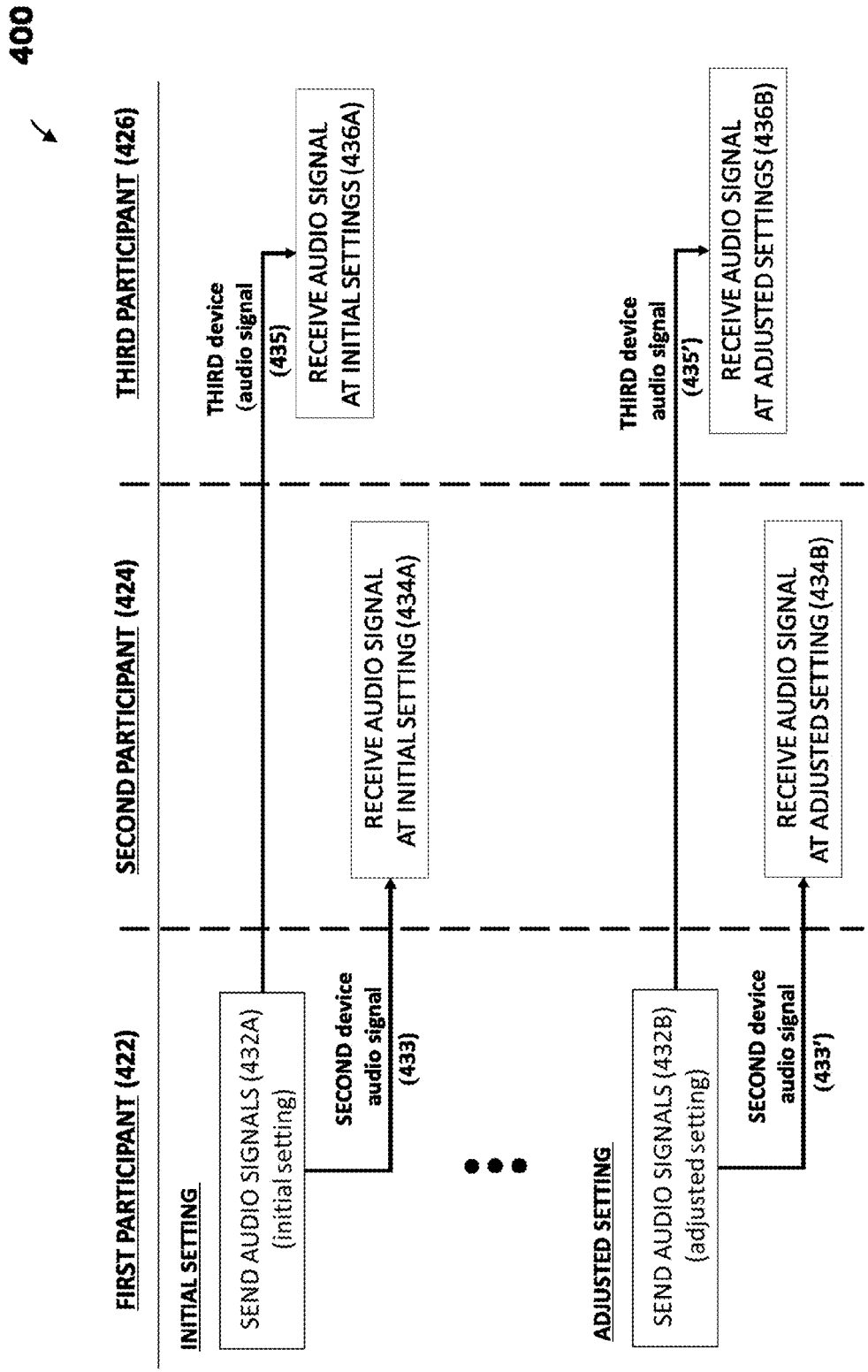
FIG. 4 is a diagram clarifying the terminology of the audio signals flow between the communications devices associated with participants of a common communication session.

Functional Volume Control:

The flowchart 400 of FIG. 4, is provided to clarify terminology used herein to describe the audio signals flow between the communications devices associated with participants of a common communication session. A communication device associated with a first participant 422 may send audio signals to the communication devices associated with a second participant 424 and a third participant 426.

The signal transmitted from the communication device associated with the first participant 422 to the communication device associated with the second participant 424 may be referred to as the second device audio signal 433, 433'.

The signal transmitted from the communication device associated with the first participant 422 to the communication device associated with the third participant 426 may be referred to as the third device audio signal 435, 435'.

Figure 5:
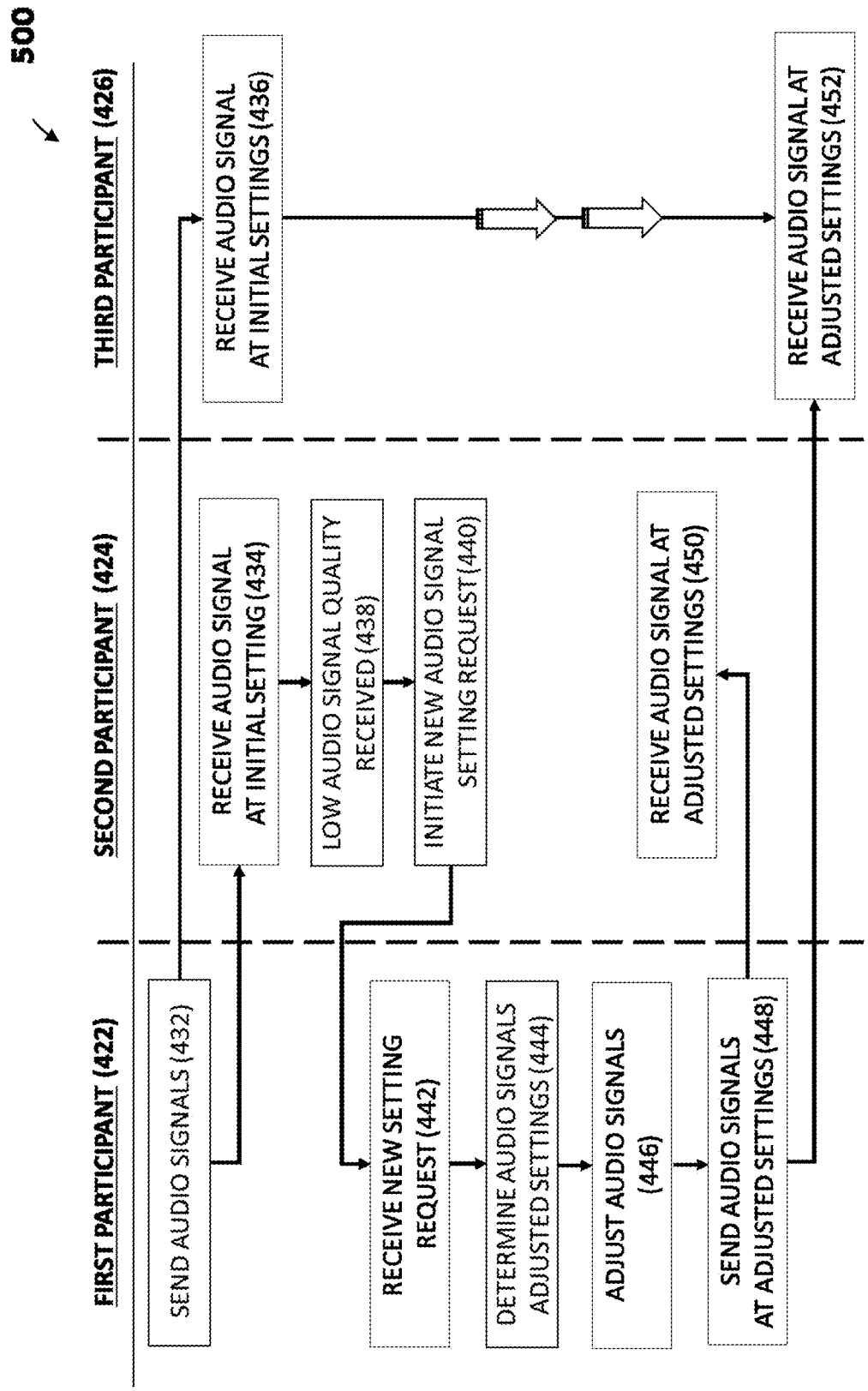
FIG. 5 is a flowchart representing a first method for adjusting audio settings in a common communication session initiated by a request from the second participant.
Figure 8:
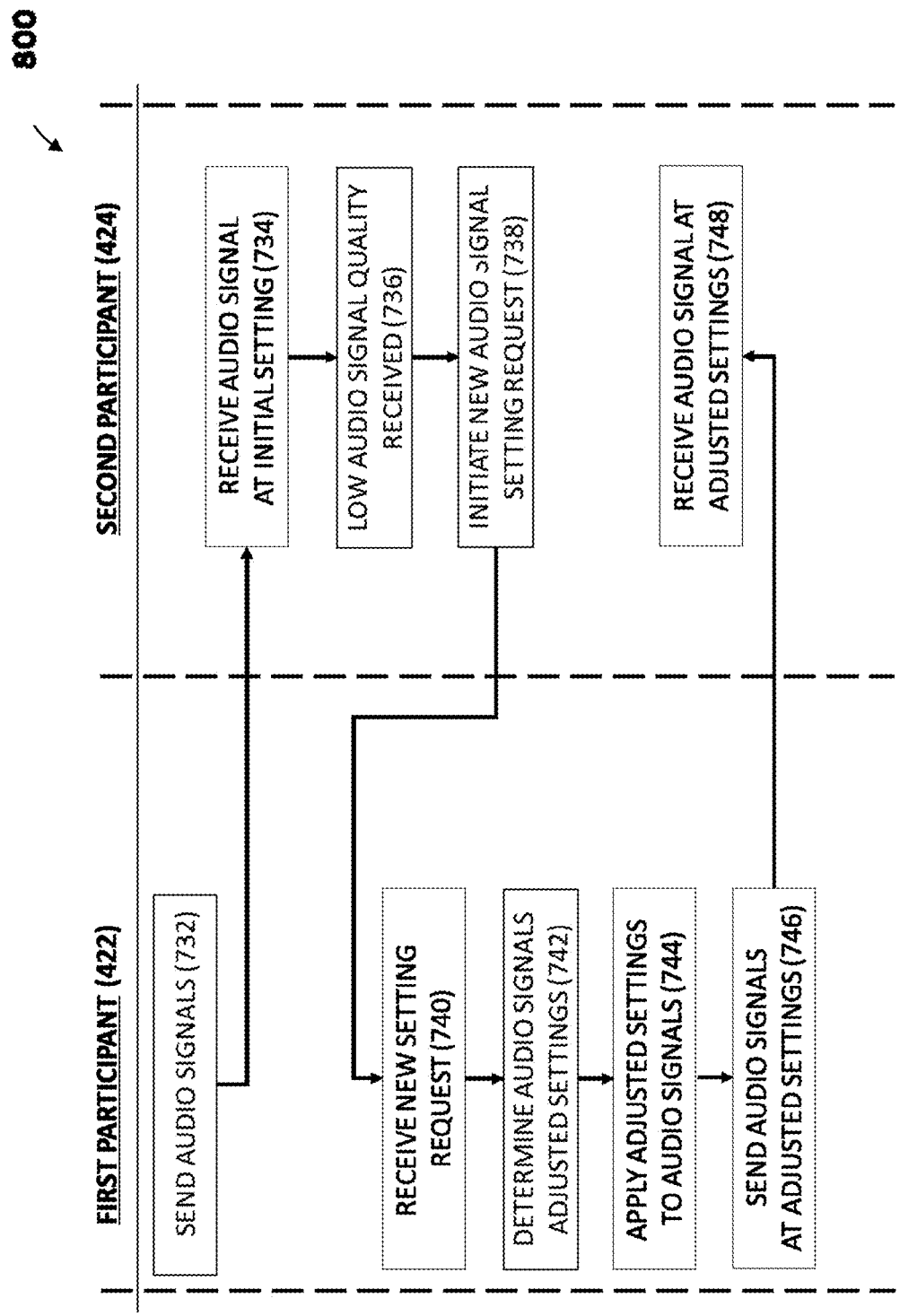
FIG. 8 is a flowchart representing a method for adjusting audio settings in a common communication session between at least a first participant and a second participant associated with a second communication device.

As illustrated, the flowcharts of FIG. 5 through to FIG. 8, are provided to present various suggested methods associated with the volume adjustment in a common communication session. The client terminal, or communication device, associated with a participant, such as a land line telephone, smartphone, personal computer, tablet and the like, may trigger a volume adjustment process to resolve the current condition. For example, if a noisy client terminal reduces the volume level or mutes itself, this may have impact on other participants. Similarly, if a poorly-heard client terminal increases its volume level, the volume increase may be reflected to benefit other participants through their communication devices.

Figure 7:
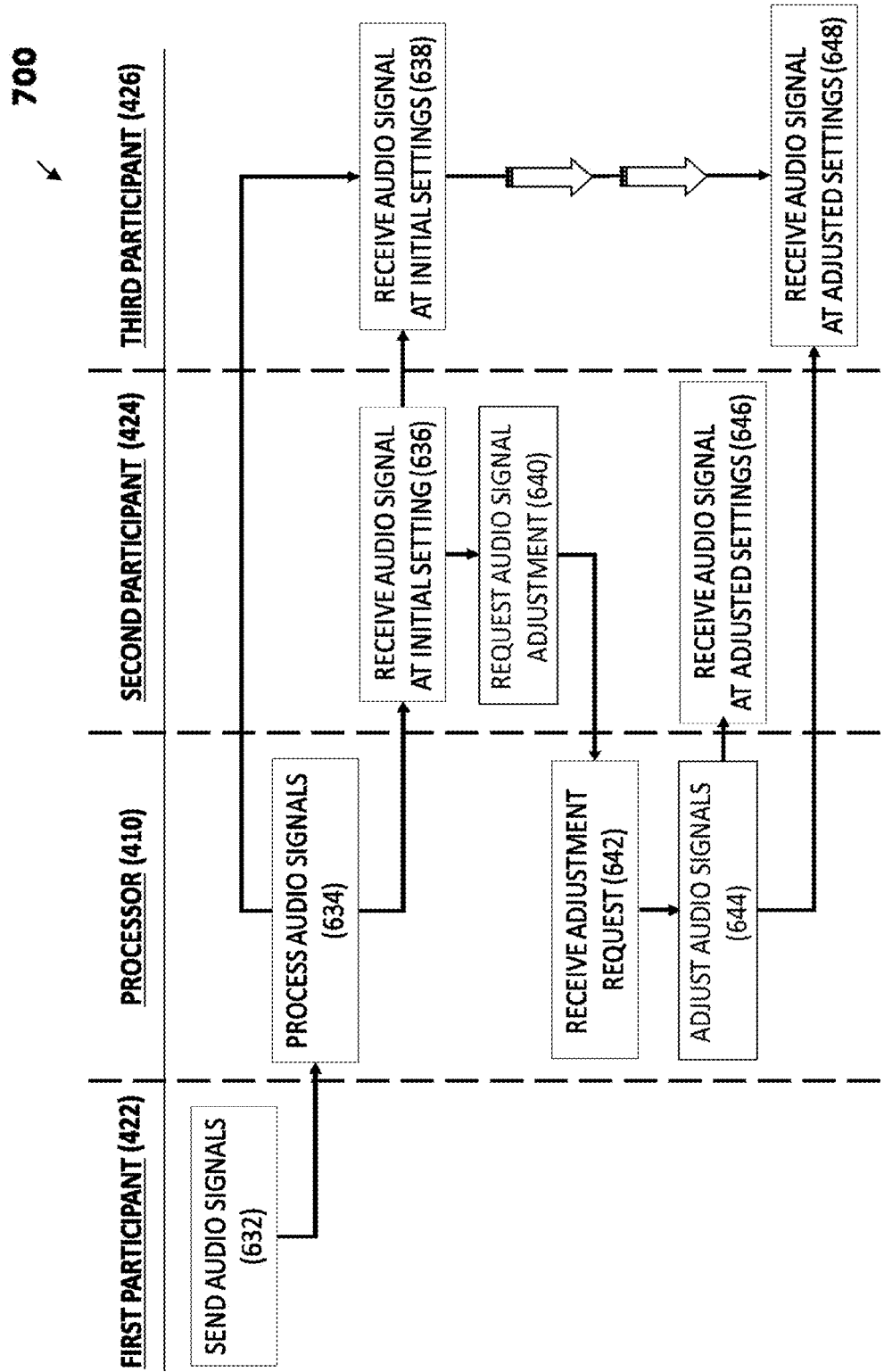
FIG. 7 is a flowchart representing a method for adjusting audio settings in a common communication session controlled via a processing unit.

It is noted that, for illustrative purposes, the methods as described in FIG. 5 through to FIG. 8 are associated with interactions between the various participants of a common communication session, a first participant 422, a second participant 424 and a third participant 426. It will be appreciated that the methods described herein may be scaled to communication sessions between any number of participants from two participants and up. Optionally, the interactions may be facilitated by use of a processor 410 (as shown in FIG. 7).

It is noted that the processor 410 may be associated with the first participant communication device.

Optionally, the processor 410 may be associated with at least one participant.

Optionally, the processor 410 may be associated with a server providing conference call services.

According to one aspect of the current disclosure, a participant requiring an adjustment to the audio settings of another participant may initiate a message request requesting an adjustment to the audio settings of a target participant's associated communication device. The message request may specify various actions such as increase or decrease of volume level, mute/un-mute operations. Additionally or alternatively, the message request may indicate an absolute volume value or a relative change to the current volume level.

Optionally, the message request may be transmitted to a receiving communication device using the same communication channel as the common communication session. Alternatively, a separate communication channel may be used for the message request. For example, in a common communication session conducted using Voice over IP (VoIP) technology, such a message request may be transmitted over the underlying IP network. Additionally or alternatively, the message request may be transmitted over a separate wireless or cellular network.

The receiving communication device which may be associated with a receiving participant or may be a central processing unit for the example, may decode and authenticate the message request, and then execute the adjustment to the audio settings such as volume level of the audio signal associated with the target communication device output audio signal according to the request. This adjustment may affect audio signals received by all other participants such that they receive further audio signal stream from the target participant, according to the adjusted audio setting.

The requesting participant may be the host or the initiator of the common communication session. Alternatively, the requesting participant may be another participant in the common communication session such that any participant may be authorized to adjust the audio signal of any other participant.

It is noted that authorization to change volume of other participant communication devices may be granted selectively. Authorization for applying such adjustments may be conditional upon permissions assigned to each participant. Where authorization is required to apply the audio setting adjustments in a common communication session, certain participants, such as the host participant, may be allowed to be the requesting participant, as a default option.

Such techniques of using message-based interactions between the participants of the common communication session may be provided by a software based technical solution. Additionally or alternatively, hardware solution/adjustments may be required and implemented.

Reference is now made to the flowchart of FIG. 5, a method 500 is presented for controlling and adjusting the volume in a common communication session. A first participant 422 may send audio signals to the communication devices associated with a second participant 424 and a third participant 426. The adjustment request is initiated by a second communication device associated with the second participant 424 and transmitted to a first communication device associated with the first participant 422.

Accordingly, in the method 500 audio adjustment is initiated by the second participant 424 and is directed to adjusting the audio settings of a second device audio signal sent by a first communication device associated with the first participant 422 to a second communication device associated with the second participant 424 and a third device audio signal sent by the first communication device associated with the first participant 422 to a third communication device associated with the third participant 426. The adjustment may be executed during a common communication session, based upon a request transmitted from the communication device associated with the second participant 424.

It is noted that the method 500 may be executed in a tele-conferencing communication system such as described hereinabove, controlled by the communication device associated with the first participant 422 of the common communication session.

It is particularly noted that when the second device audio signal from the communication device associated with the first participant is adjusted according to the request received from the communication device associated with the second participant, then, the third device audio signal is also adjusted. Thus, only one participant in the conference call needs to request any associated adjustment. Furthermore, the adjustment response to the request may affect all other participants of the communication session.

Where appropriate, the request for adjustment of an audio setting of a communication device may request that the audio signals be muted or unmuted. These actions may be initiated by the second participant who may mute/unmute the first participant's associated communication device, where required for the benefit of all participants of the conference call.

Additionally or alternatively, the adjustment request may be for a change in the volume level of the transmitted audio signals. Thus, the second participant may control an increase or decrease of the volume level of the communication device associated with the first participant for the benefit of all participants of the conference call.

Optionally, the system may be configured such that the change in volume level of the audio signals may be defined as a new absolute volume level. For example, the request may be to set the level of the audio signal received from the first participant to a given number of decibels.

Optionally, the system may be configured such that the change in the volume level of the audio signals may be defined as an absolute change to the initial volume level. For example, the request may be to increase or decrease the level of the audio signal received from the first participant by a given number of decibels.

Optionally, the system may be configured such that the change in the volume level of the audio signals may be defined as a relative change to the initial volume level. For example, the request may be to increase or decrease the level of the audio signal received from the first participant by a percentage value.

Still other audio settings may be adjusted as required. For example, a frequency filter may be applied to reduce high frequency noise, such as crackling or hissing or low frequency noise such as booming or specific frequency noise such as humming or the like.

The initiator of the conference call may be a particular participant. Thus, a conferencing system may be implemented to allow only the initiator of a conference call to make adjustments to audio signals of other participants that are affecting all other participants. In such systems a participant other than the initiator may not be allowed to make such global adjustments to audio signals without being granted permission. Nevertheless other participants may still be allowed to make local adjustments that affect only their communication devices (for example muting out a specific participant or adjusting the volume of a specific participant without affecting other participants).

Alternatively, a conferencing system may be implemented in which every participant is allowed to make adjustments to audio signals of any other participant that are affecting all other participants. In addition, every participant may also be allowed to make local adjustments that affect only their own communication devices.

The method 500 includes sending a second device audio signal and a third device audio signal (referred to collectively as audio signals) by a first communication device associated with the first participant 422 directed to the second communication device and the third communication device, at an initial set of audio settings—step 432, to all participants of the common communication session; receiving, by the communication device associated with the second participant 424, the audio signal at the initial audio setting as determined by the first participant—step 434; and, similarly, receiving, by the communication device associated with the third participant 426, the audio signal with the initial set of audio settings—step 436.

Where the second communication device associated with the second participant 424 receives an audio signal at an undesired quality—step 438, the second participant may initiate, via the second communication device, a new adjusted audio signal setting request—step 440. The request may be received by the first communication device associated with the first participant—step 442; an adjusted set of audio settings may be determined for the outgoing audio signals according to request—step 444; and the audio signals may be adjusted accordingly—step 446, possibly by the first communication device associated with the first participant 422; and the first communication device may provide audio signals with the adjusted audio settings—step 448, to the second communication device associated with the second participant 424 and to the third communication device associated with the third participant 426.

Where the second device audio signal and the third device audio signal share a common root signal output from the first communication device, the adjusted set of audio settings may be usefully applied to the common root signal. Alternatively, the adjusted audio settings may be applied separately to each of the audio signals.

Accordingly, the second device audio signal is received at the adjusted settings by the second participant—step 450; and the third device audio signal is received at the adjusted settings by the third participant—step 452.

As appropriate, the request message may be transmitted using the same communication channel used by the conference call. Additionally or alternatively, another communication channel may be used. For example, in a conference call conducted using VoIP technology such message may be transmitted over the underlying IP network, or it may be transmitted over a separate cellular network.

The communication device associated with the receiving participant may decode and authenticate the message. Accordingly, the communication device, may then perform actions associated with the request by adjusting the set of audio settings or the volume level of the audio signal according to the request. Additionally, the adjusted communication device may apply further measures associated with quality, for example. This may imply that all communication devices taking part in the conference call will now receive the audio signal stream coming from the adjusted communication device at a more desirable quality.

It is noted that the requesting participant may be the host or the initiator of the conference call. Optionally, the host or the initiator may be the only authorized participant to execute the adjustments. Alternatively, any participant of the common communication session may be authorized to perform audio adjustment of communication devices associated with other participants.

Because the second participant and the third participant may use different types of communication devices which may be connected through different types of networks, the quality of the audio signal received by the second participant from the first participant may be different from the quality of the audio signal received by the third participant from the first participant. If the settings adjustment method of FIG. 5 is applied in such case, the adjustment made following a request initiated by the second participant may cause unacceptable degradation in the quality of the audio signal received by the third participant from the first participant. For example, if the quality of the audio signal received by the second participant from the first participant is very good but the quality of the audio signal received by the third participant from the first participant is poor, and if the second participant requests from the first participant to reduce the volume of the audio signals it sends out, then the adjustment will also reduce the volume of the audio signal received by the third participant from the first participant and because that signal has poor quality before the adjustment, this may result in the signal becoming incomprehensible after the volume-reducing adjustment. For handling such cases an adjustment method is required that takes into account the characteristics of the audio signal received by the third participant from the first participant when making an adjustment to the signals sent out by the first participant because of an adjustment requested by the second participant.

Figure 6:
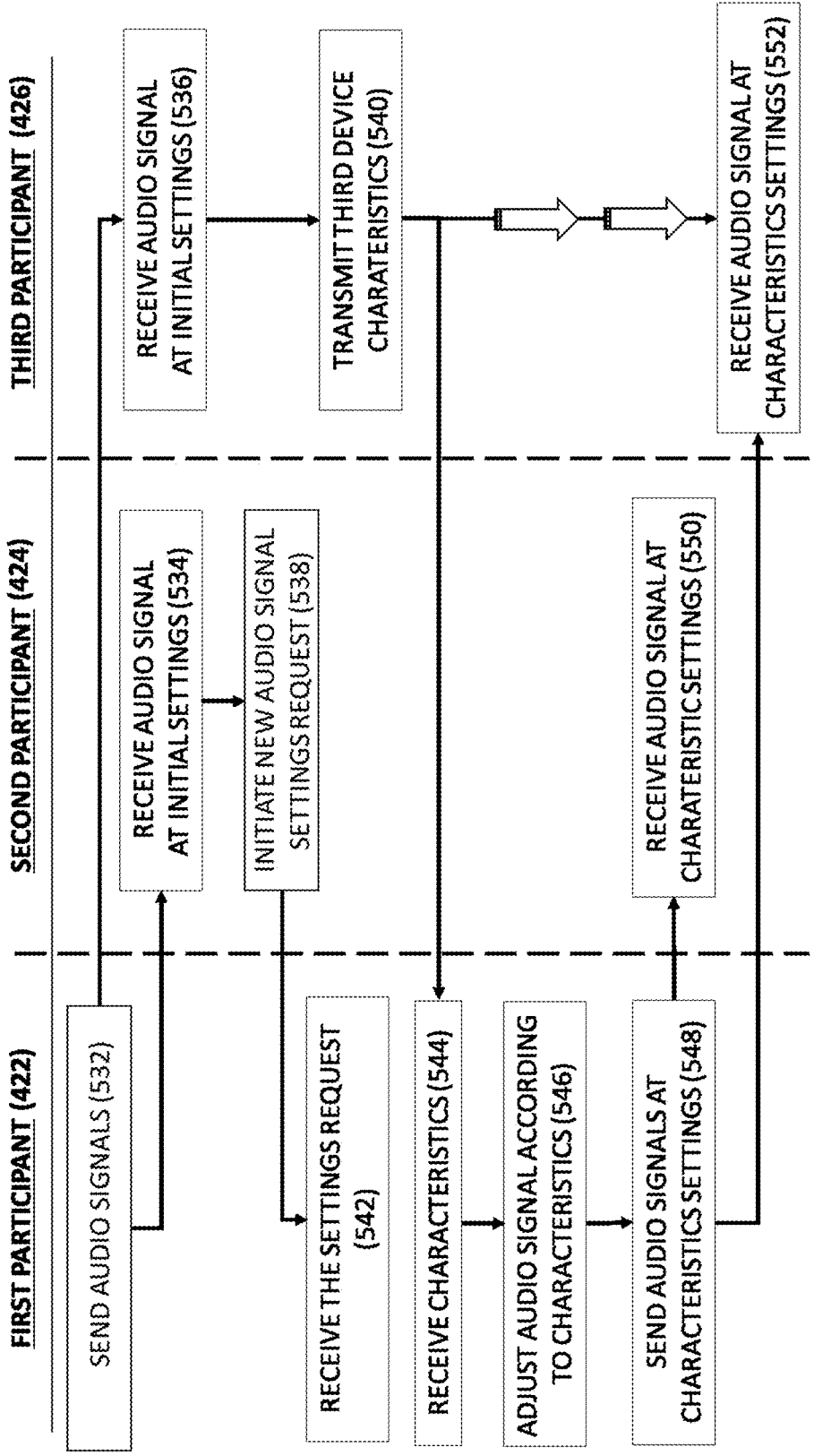
FIG. 6 is a flowchart representing another method for adjusting audio settings in a common communication session and further controlled by audio characteristics from a third participant.

Non-Homogenous Systems:

Reference is now made to the flowchart of FIG. 6, a method 600 is presented for controlling and adjusting the volume in a common communication session, further based upon third device audio characteristics of a communication device associated with the third participant.

It is noted that the term "audio characteristic of an audio signal" refers to one or more parameters associated with the audio signal such as a quality measure of the audio signal. For example, the characteristic may be a numerical quality grade using a scale of 1 to 10, with 10 being the highest quality. Alternatively, the characteristic of an audio signal may be the volume level of the audio signal. For example, the characteristic may be a volume level expressed in decibels. The term "device audio characteristic" refers to an audio characteristic associated with a device, for example an audio characteristic of an audio signal received at the device.

It is also noted that the term "characteristic settings" refers to audio settings determined based, at least in part, on some audio characteristic value. Consequently, when referring to "an audio signal at characteristic settings" the reference may be to an audio signal that was adjusted according to audio settings determined based, at least in part, on some audio characteristic value, where the audio characteristic value may be associated with a different audio signal than the one being adjusted.

Non-homogenous conferencing systems may include a mixture of communication devices such as of land-lines telephone, mobile communication devices (such as smartphones, tablets and the like), personal computers, laptops and more. Such devices may use different communication technologies such as Public Switched Telephone Network (PSTN) technology, wireless technology and Wi-Fi/Internet technology.

In such mixed technology environments, communication devices associated with two participants, may receive different quality levels or different volume levels of audio signals transmitted by a communication device associated with a third participant, for example. Thus, when one communication device is requesting to adjust the audio signal of the communication device associated with the third participant based upon volume/quality received by the associated communication device, this may unintentionally degrade the audio signal received by the other participant to an impractical volume level.

A possible technical solution may use broadcasting of audio status messages from the communication device associated with each participant to the other communication devices of the other participants. The audio status message of one participant, may provide the current quality and/or volume level of audio signals as received by the respective communication device of the participant transmitting the status message.

Optionally, the audio status signal message may be transmitted periodically.

Optionally, the audio signal status message may be transmitted upon detecting an attempt to adjust the audio signal of a communication device associated with another participant Using the audio status messages, the system may prevent changes to the level or quality of the audio signals such that it becomes disruptive with the other participants when adjusting the audio signal of one participant by the request of another participant. The information in the audio status messages may be used when preparing the adjustment request (by limiting the request to values that may result in audio levels still acceptable for all participants) or it may be used when executing the adjustment request. As appropriate, values as specified in the message request may be ignored of changed.

Accordingly, in the method 600 audio adjustment is initiated by the second participant 424 and is directed to adjusting the audio settings such as the volume level of audio signals received from the first communication device during a common communication session, based upon a request of a communication device associated with the second participant 424 and also based on third device audio characteristics received from the third communication device associated with the third participant.

It is further noted that the method 600 may be executed in a tele-conferencing communication system such as described hereinabove, controlled by the communication device associated with the first participant 422 of the common communication session.

In method 600, the audio signal received by the second communication device associated with the second participant from the first communication device associated with the first participant, may be adjusted according to the characteristics of a communication device associated with the third participant. Thus, when the audio signal received by the communication device associated with the second participant from the communication device associated with the first participant is adjusted according to the request, the adjustment also affects the audio signal received by a communication device associated with the third participant from the first participant. Accordingly, the adjustment takes into account the characteristics of the audio signal received by the communication device associated with the third participant in such a way that the signal is still acceptable by the communication device associated with the third participant after the adjustment.

The message request for the adjustment may request a change in the volume level of the audio signal. Thus, the communication device associated with the second participant may request an increase or a decrease in the volume level of the communication device associated with the first participant. Such change may have impact on other participants of the conference call, which may now receive an unacceptable audio signal from the communication device associated with the first participant.

It is noted that the characteristics of the audio signal associated with the communication device of the third participant may be a quality measure of the third device audio signal. For example, the characteristic may be a numerical quality grade using a scale of 1 to 10, with 10 being the highest quality. Alternatively, the third device audio characteristic may comprise an array of values, each value referring to a different audio setting. For example a score may be given to each of a set of frequency ranges for an audio signal.

Variously, the third device audio characteristics may provide a measure of the quality of the third device signal received by the third communication device from the first communication device. Alternatively, the third device audio characteristics may provide a measure of the output of the speakers, earphones or other audio output hardware associated with the third communication device.

Additionally or alternatively, the characteristics of the audio signal associated with the communication device of the third participant may specify the volume level of the audio signal. For example, the characteristic may be a volume level expressed in decibels.

Optionally, the transmission of the characteristics may be performed periodically. For example, every two minutes the communication device associated with the third participant may transmit the current value of the third device characteristics, and when an adjustment is requested, the latest value available of the characteristics may be used.

Optionally, the transmission of the characteristics may be performed in response to receiving of a setting request from a communication device associated with a participant. For example, each time an adjustment request is received for the audio signal of a communication device associated with a participant, all the communication devices participating in the conference call are notified about the request and each communication device may transmit immediately the corresponding current value of the characteristic applicable for the communication device associated with the participant.

Optionally, the adjustment specified by the request may already be based upon the characteristics details. For example, the request sent by the communication device associated with the second participant may depend on the characteristic, and then the request is carried out exactly as specified.

Alternatively, the adjustment specified by the request may be independent of the characteristic. For example, the request sent by the communication device associated with the second participant may depend only on the volume level preferred for the second participant, but when the request is carried out the specified value may be overridden so as not to degrade too much the level or quality of the audio signal for the communication device associated with the third participant.

The method 600 includes sending audio signals by a communication device associated with the first participant 422 at an initial audio setting—step 532, to all participants of the common communication session; receiving, by the communication device associated with the second participant 424, the audio signal at the initial audio setting as determined by the first participant—step 534; receiving, by the communication device associated with the third participant 426, the audio signal at the initial audio setting as determined by the communication device associated with the first participant—step 536.

The second communication device associated with the second participant 424 initiates a request for an adjusted setting—step 538, and the third device audio characteristics are sent by the third communication device or are otherwise obtained—step 540.

The first communication device receives the request from the second participant—step 542; and receives the third device audio characteristics—step 544. Accordingly, the communication device associated with the first participant may adjust the audio signal setting—step 546 according to the adjustment request, and based upon the characteristics.

Accordingly, the first communication device may send the audio signals adjusted at the characteristics settings to the communication devices associated with the second participant and the third participant—step 548; and the second device audio signal is received, by the second communication device, adjusted according to the characteristics settings—step 550; and the third device audio signal is received, by the third communication device, adjusted according to the characteristics settings as determined in part by the third device audio characteristics—step 552.

With particular reference to FIG. 7, a method 700 is presented for controlling and adjusting the volume in a common communication session controlled and managed via a processing unit. The method 700 associated with the processing unit 410, is directed towards adjusting the volume of audio signals received from the communication device associated with the first participant 422 during a common communication session, based upon a request of a communication device associated with the second participant 424, receiving one of the audio signals. The method 700 may be implemented in a tele-conferencing communication system such as described hereinabove, using a processing unit associated with a server provider. The message request may be initiated by a communication device associated with the second participant of the common communication session, which receives one of the audio signals.

The method 700 includes sending audio signal by a first communication device associated with the first participant 422 at an initial audio setting—step 632, the audio signal is sent to the processor 410 which is in charge of sending corresponding audio signals to all participants of the common communication session; the audio signals may be processed by the processor 410—step 634; which may transmit a second device audio signal to a second communication device associated with the second participant and a third device audio signal to a third communication device associated with the third participant. Accordingly, the second communication device receives the second device audio signal at the initial audio setting—step 636; and the third communication device receives the third device audio signal at the initial audio setting—step 638. The second communication device initiates a message request for audio signal adjustment—step 640. The request may be received by the processing unit 410—step 642; and the processor may adjust the audio settings accordingly—step 644. The audio signals may be transmitted such that, the second communication device receives the second device audio signal with the adjusted set of audio settings—step 646; and the third communication device receives the third device audio signal with the adjusted set of audio settings—step 648.

Although the above embodiments and methods are described in relation to a joint communication session between only three participants, it will be appreciated that methods of the invention may be applicable to joint communications sessions between any number of participants as required. Specifically, the methods are applicable to telephone calls between two participants and multi-person conference calls, between greater numbers of participants.

Reference is now made to the flowchart 800 of FIG. 8, another method is presented for controlling and adjusting audio settings in a common communication session between two participants.

The method may be used, for example, in a communication system enabling a common communication session between at least a first participant 422 associated with a first communication device and a second participant 424 associated with a second communication device. The method may enable control of an audio signal sent by the first communication device to a second communication device, using an initial set of audio settings. In other embodiments, the method may be used to control a plurality of audio signals as required.

The method 800 includes sending a second device audio signal by a first communication device associated with the first participant 422 directed to the second communication device at an initial set of audio settings—step 732; receiving, by the communication device associated with the second participant 424, the second device audio signal at the initial audio setting as determined by the first participant—step 734; receiving an audio signal at an undesired quality, by the second communication device associated with the second participant 424—step 736; initiating, by the second communication device associated with the second participant, a new adjusted audio signal setting request—step 738; receiving, by the first communication device, the setting request from the second communication device for an adjustment to at least one audio setting of the second device audio signal.

Optionally, the request is transmitted from the second communication device to the first communication device through a network used for sending the second device audio signal from the first communication device to the second communication device.

The request may be received, by the first communication device associated with the first participant—step 740; determining, by the first communication device, for the outgoing audio signals, an adjusted set of audio settings according to the request from the second communication device—step 742; and applying the adjusted setting to outgoing audio signals—step 744, by the first communication device associated with the first participant; transmitting the audio signals at the adjusted settings—step 746; and receiving, by the second communication device associated with the second participant the second device audio signal at the adjusted setting—step 748.

It should be noted that method 800 allows the second communication device to cause an adjustment of the second device audio signal, for example an adjustment of the volume level of the second device audio signal, without requiring extra circuitry for affecting such adjustment. Instead, an adjustment request is sent to the first communication device which executes the adjustment on behalf of the requesting device. This way a communication device only needs circuitry for adjusting its own audio signals which it sends out to other communication devices taking part in a common conferencing session, but not circuitry for adjusting incoming audio signals received from other communication devices taking part in a common conferencing session.

As noted above, in other embodiments, the method 800 of FIG. 8, mutatis mutandis, may be used to control a plurality of audio signals as required. For example, with reference back to FIG. 4, in a system where a first participant 422 sends both a second device audio signal 433 to a second participant 424 and a third device audio signal 435 to a third participant 426, the method may be used to control both the second device audio signal 433 and the third device audio signal 435.

The scope of the disclosed subject matter is defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for use in a conference call system comprising a set of communication devices, said conference call system enabling a common communication session between at least a first participant associated with a first communication device, a second participant associated with a second communication device and a third participant associated with a third communication device, said method for controlling in an improved manner at least a second device audio signal sent by said first communication device to said second communication device using an initial set of audio settings and a third device audio signal sent by said first communication device to said third communication device using said initial set of audio settings, the method comprising the following steps:

receiving a request from the second communication device for an adjustment to at least one audio setting of said second device audio signal;

determining an adjusted set of audio settings according to the request; and providing said second device audio signal to said second communication device using said adjusted set of audio settings and providing said third device audio signal to said third communication device using said adjusted set of audio settings.

2. The method of claim 1, wherein said second device audio signal and said third device audio signal share a common root signal output from said first communication device, the method further comprising applying said adjusted set of audio settings to said common root signal.

3. The method of claim 1, wherein said second device audio signal is transmitted by said first communication device as a distinct audio signal directed to the second communication device and said third device audio signal is transmitted by said first communication device as a distinct audio signal separately directed to the third communication device.

4. The method of claim 1, wherein the second device audio signal is received by the second communication device directly from the first communication device, and the determining of the adjusted set is performed by the first communication device.

5. The method of claim 1, wherein the conference call system further comprises a central processor, and said second device audio signal is received by the second communication device from the first communication device via said central processor and further wherein the determining of the adjusted set is performed by the central processor.

6. The method of claim 1, wherein said receiving, determining and providing steps are executed by a processor incorporated into said first communication device.

7. The method of claim 1, wherein said receiving, determining and providing steps are executed by a processor incorporated into a central processing unit.

8. The method of claim 1, wherein an audio volume level of said adjusted set of audio settings differs from an audio volume level of said initial set of audio settings.

9. The method of claim 8, wherein said audio volume level of said adjusted set of audio settings is a muted audio level.

10. The method of claim 1, wherein said request requests an adjustment of an audio volume level of said second device audio signal, and the adjustment is defined as one of an absolute value of an audio volume level, an absolute offset to a current value of an audio volume level, and a relative offset to a current value of an audio volume level.

11. The method of claim 1, wherein an initiator of the common communication session is the second participant.

12. The method of claim 1, wherein an initiator of the common communication session is a participant other than the second participant.

13. A method for use in a conference call system comprising a set of communication devices, said conference call system enabling a common communication session between at least a first participant, associated with a first communication device, a second participant associated with a second communication device and a third participant associated with a third communication device, said method for controlling in an improved manner at least a second device audio signal sent by said first communication device to said second communication device, using an initial set of audio settings, the method comprising the following steps:
receiving a request from the second communication device for an adjustment to at least one audio setting of said second device audio signal;
obtaining at least one third device audio characteristic associated with the third communication device;
determining an adjusted set of audio settings according to the request from the second communication device and according to said at least one third device audio characteristic; and
providing said second device audio signal to said second communication device using said adjusted set of audio settings.

14. The method of claim 13, wherein said request from the second communication device requests an adjustment to an audio volume level of said second device audio signal.

15. The method of claim 13, wherein said at least one third device audio characteristic comprises an indication of quality of a third device audio signal sent by said first communication device to said third communication device.

16. The method of claim 13, wherein said at least one third device audio characteristic comprises an indication of an audio volume level of a third device audio signal sent by said first communication device to said third communication device.

17. The method of claim 13, wherein said at least one third device audio characteristic comprises an indication of an audio volume level of said third communication device.

18. The method of claim 13, wherein said obtaining said at least one third device audio characteristic is performed periodically.

19. The method of claim 13, wherein said obtaining said at least one third device audio characteristic is performed in response to receiving said request from the second communication device.

20. A method for use in a communication system enabling a common communication session between at least a first participant, associated with a first communication device, and a second participant associated with a second communication device, said method for controlling in an improved manner at least a second device audio signal sent by said first communication device to said second communication device, using an initial set of audio settings, the method comprising the following steps:
receiving, by said first communication device, a request from the second communication device for an adjustment to at least one audio setting of said second device audio signal;
determining, by said first communication device, an adjusted set of audio settings according to the request from the second communication device; and
applying, by said first communication device, said adjusted set of audio settings to said second device audio signal.

21. The method of claim 20, wherein the request is transmitted from the second communication device to the first communication device through a network used for sending the second device audio signal from the first communication device to the second communication device.

22. A communication system enabling audio control during a common communication session between at least a first participant and a second participant, said communication system comprising:
a first communication device associated with said first participant and operable to send at least a second device audio signal;
a second communication device associated with said second participant and operable to receive at least said second device audio signal and to send a request for an adjustment to at least one audio setting of said second device audio signal; and
at least one processor operable to receive said request from the second communication device, to determine an adjusted set of audio settings according to the request; and to provide said second device audio signal to said second communication device using said adjusted set of audio settings.

23. The communication system of claim 22, wherein said at least one processor is incorporated into said first communication device.

24. The communication system of claim 22, wherein said at least one processor is incorporated into a central processing unit.

25. The communication system of claim 22 for enabling audio control during said common communication session between said first participant, said second participant and a third participant, said communication system further comprising:
  a third communication device associated with said third participant and operable to receive at least a third device audio signal from said first communication device, and wherein
  said at least one processor is further operable to provide, in response to said request, said third device audio signal to said third communication device using said adjusted set of audio settings.

* * * * *